United States Patent [19]
Yoshino

[11] Patent Number: 5,750,955
[45] Date of Patent: May 12, 1998

[54] HIGH EFFICIENCY, VARIABLE POSITION PLASMA WELDING PROCESS

[75] Inventor: Fumito Yoshino, Fujisawa, Japan

[73] Assignee: Kabushiki Kaisha Kobe Seiko Sho, Kobe, Japan

[21] Appl. No.: 738,071

[22] Filed: Oct. 25, 1996

Related U.S. Application Data

[62] Division of Ser. No. 266,660, Jun. 28, 1994, Pat. No. 5,599,469.

[51] Int. Cl.⁶ .................................................. B23K 10/00
[52] U.S. Cl. .................. 219/121.46; 219/121.59; 219/137 R; 219/125.11; 219/60 A
[58] Field of Search ................ 219/121.45, 121.46, 219/137 R, 59.1, 60 R, 61, 60 A, 125.11

[56] References Cited

U.S. PATENT DOCUMENTS

| | | | |
|---|---|---|---|
| 4,051,342 | 9/1977 | Stubbings | 219/60 A |
| 4,285,460 | 8/1981 | Clavin | 228/212 |
| 4,373,125 | 2/1983 | Kazlauskas | 219/60 A |
| 4,918,283 | 4/1990 | Yamade et al. | 219/121.46 |
| 5,304,776 | 4/1994 | Buerkel et al. | 219/125.11 |

*Primary Examiner*—Mark H. Paschall
*Attorney, Agent, or Firm*—Oblon, Spivak, McClelland, Maier & Neustadt, P.C.

[57] ABSTRACT

In a plasma welding process, a voltage is applied between an electrode and an object for welding with injecting a plasma gas to generate a plasma, and welding is performed with taking the plasma as a heat source. The process cyclically varies energy contained in a plasma arc by cyclically varying a plasma gas flow rate.

10 Claims, 16 Drawing Sheets

HIGH EFFICIENCY, VARIABLE POSITION PLASMA WELDING PROCESS

This is a division of application Ser. No. 08/266,660, filed on Jun. 28, 1994, now U.S. Pat. No. 5,599,469.

BACKGROUND OF THE INVENTION

1. Field of the Invention

The present invention relates generally to a plasma welding process. More specifically, the invention relates to a plasma welding process suitable for performing plasma welding for a welding portion of a plate having a thickness of greater than or equal to 6 mm with sequentially varying welding position, such as plasma welding for medium or large diameter stationary pipe, tank or ship and so forth.

2. Description of the Related Art

A plasma welding is a welding method employing a high energy beam as a heat source. Amongst, a keyhole welding employing a plasma as the heat source has been employed in view of improvement of efficiency.

FIG. 1A is a longitudinal section showing a plasma keyhole welding process, and FIG. 1B is a plan view thereof. In a welding torch 1, a non-consumable electrode 2 is arranged at the center portion. About this non-consumable electrode 2, a plasma gas nozzle 3 and a shield gas nozzle 4 are arranged in coaxial fashion. By condensing energy of an arc generated by the non-consumable electrode 2 by passing through the nozzle 3 and passing a plasma gas through the high temperature arc to form a plasma state, a plasma arc 9 is generated by ionization of the plasma gas. The plasma arc 9 is cooled by the shield gas injected from the shield gas nozzle 4 to be restricted from spreading and protected from oxidation by the ambient air. The plasma arc 9 is a high energy heat source which locally heats a plate 5 to be welded as the base material to form a molten pool 6. On the other hand, by the plasma arc injected at high velocity, the molten metal is depressed to form a keyhole 8. By moving the plasma arc 9 along a groove 10 of the plate 5 to be welded, a plasma keyhole is advanced with the melting of the base material. Then, the molten metal is moved backwards to fill the rear side keyhole. Therefore, the keyhole is constantly maintained at a fixed configuration. At the backside of the plasma arc 9 with respect to the moving direction, the molten pool 6 is formed and the molten metal is solidified to form a molten bead 7 at the further backside. The keyhole welding is a most particular high efficiency welding process of the plasma welding which can form a penetration bead as shown in FIGS. 1A and 1B.

Conventionally, in the plasma keyhole welding, a pulse current having a peak current value and a base current value is supplied to the electrode. The peak current value, the base current value, frequency and so forth of the pulse current are adjusted for controlling the plasma arc, as disclosed in Japanese Unexamined Patent Publication (Kokai) No. Showa 60-27473.

However, this process encounters a problem in that the rising period and falling period of respective pulses becomes instant upon control of the pulse current which possibly causes disturbance of the molten pool.

On the other hand, the molten pool 6 has a tendency to become wide at the side of the torch 1 resulting in the so-called wine cup-like configuration. Since the width of the molten pool is strongly influenced by the current, higher current tends to cause increasing of the width of the molten pool rather than increasing of the depth of the molten pool. Increasing of the width of the molten pool will not contribute toward the formation of the keyhole. In case of the upward welding, the widened molten pool possibly causes melting down of the molten pool. Therefore, in the practical plasma arc control method, employing the current is not so effective in prevention melting down of the molten pool and in control for all position welding, for example.

In particular, in the plasma welding, the melting configuration tends to cause the wine cup like configuration to have large bead width in the vicinity of the surface of the base material and to cause increasing of the molten metal amount which increases tendency of drooping down or dropping down of the molten pool. This increases the tendency of the phenomenon set forth above.

Namely, in the case of the welding for the entire circumference of the medium or large diameter horizontal stationary pipe, tank or so forth, the all-position welding which varies positions from the downward position to upward position across vertical position has to be performed from an initial layer to a final layer. Particularly, when the plasma keyhole welding is applied for the initial layer welding, drooping down of the molten pool is easily caused. Even if the drooping down of the molten pool can be successfully prevented, there still remains a problem that readily causes projecting bead or penetration failure.

As set forth above, in the prior art, all-position welding, in which the welding position is varied from the downward position to the upward position across the vertical position, should be performed over the initial layer to the final layer which makes setting of the welding conditions more complicated.

In case of welding of the stationary pipe, particularly the horizontal stationary pipe, the welding operation is typically performed by an upwardly advancing welding progressing from the lower portion to the upper portion or the all-position welding progressing from the downward position to the upward position across the vertical position and subsequently from the upward position to the downward position across the vertical position. In such case, when the initial layer is welded by arranging the welding torch at the outside of the pipe to perform welding with directing the torch toward external surface of the pipe to be welded, the penetration bead can becomes excessive at the portion near the upper portion of the pipe. Conversely, lack of penetration can be caused in the vicinity of the lower portion. Therefore, it is difficult to stably form a uniform bead. In such case, while the plasma arc welding can obtain deeper penetration depth in comparison with other welding processes and thus is efficient, difficulty is encountered in stabilizing the arc.

In the conventional plasma arc welding employing a pure argon gas as a plasma gas (center gas), the stability of the arc is insufficient in the case of circumferential welding of the stationary pipe. In addition, in the circumferential welding for the stationary pipe, the plasma arc welding tends to cause a blow hole at the bottom portion of the welding bead to cause difficulty in obtaining an excellent welding portion. This is particularly remarkable in the case of non-keyhole welding, in which the keyhole is not formed.

In contrast to the keyhole welding, the non-keyhole welding (soft plasma welding) is employed in welding without forming the penetration bead. In such non-keyhole welding, the pure argon gas is typically used as the plasma gas. In such conventional plasma arc welding using the pure argon gas as the plasma gas, a plasma jet has a tendency to be captured in the molten pool to cause a blow hole in the bottom of the bead. In the worst case, the plasma jet captured in the molten pool may form a tunnel-like defect. Therefore, difficulty is encountered in obtaining excellent welding portion. This phenomenon is remarkable in the case where the flow rate of the plasma gas is greater than or equal to 1.0 l/min.

On the other hand, in view of the surface property of the base material, when the base material, which is processed by machining or grinding to remove surface scale and is then cleaned, such as a steel plate, is welded by the plasma arc welding, relatively stable and less defective molten metal can be obtained. However, when the surface is not cleaned, for example, in the case where the scale is remaining, the arc can be disturbed by the effect of the iron oxide and easily forms the defects, such as the blow hole in the molten metal.

SUMMARY OF THE INVENTION

It is an object of the present invention to provide a plasma welding process which permits welding at high efficiency for the objective portion for welding where the welding position varies sequentially, without causing drooping down or dropping down of a molten pool or penetration failure, and can provide a welding portion with a deep penetration.

According to one aspect of the invention, a plasma welding process, in which a voltage is applied between an electrode and an object for welding with injecting a plasma gas to generate a plasma, and welding is performed with taking the plasma as a heat source, wherein the process comprises the step of:

cyclically varying energy contained in a plasma arc by cyclically varying a plasma gas flow rate.

According to another aspect of the invention, a plasma welding process for an initial layer welding in circumferential direction for stationary pipes mating in alignment in horizontal or tilted orientation through a process, in which a voltage is applied between an electrode and an object for welding with injecting a plasma gas to generate a plasma, and welding is performed with taking the plasma as a heat source, wherein the process comprises the step of:

performing welding on the internal surface of the lower half of said stationary pipes and performing welding on the external surface of the upper half of said stationary pipes.

According to a further aspect of the invention, a plasma welding process for an initial layer welding in circumferential direction for stationary pipes mating in alignment in horizontal or tilted orientation through a process, in which a voltage is applied between an electrode and an object for welding with injecting a plasma gas to generate a plasma, and welding is performed with taking the plasma as a heat source, wherein the process comprises the step of:

starting welding from the upper end of said stationary pipe and progressing the welding constantly in downward direction.

BRIEF DESCRIPTION OF THE DRAWINGS

The present invention will be understood more fully from the detailed description given herebelow and from the accompanying drawings of the preferred embodiment of the present invention, which, however, should not be taken to be limited to the invention, but are for explanation and understanding only.

In the drawings.

DESCRIPTION OF THE PREFERRED EMBODIMENTS

The present invention will be discussed hereinafter in detail with reference to the accompanying drawings.

In contrast to the conventional plasma welding, in which a flow rate of a plasma gas is constant, the present invention cyclically varies performance of a plasma arc by cyclically varying the plasma gas flow rate. When the plasma gas flow rate is increased, a plasma state gas is injected at high energy density and high velocity to strongly depress a molten metal. Therefore, by cyclically varying the plasma gas flow rate, the performance of the plasma arc, namely penetration depth and configuration of the molten metal, can be cyclically varied. Variation of the plasma gas flow rate can be pulse like configuration of alternating sequence of a peak gas flow rate and a base gas flow rate which is smaller than the peak gas flow rate.

In this case, the variation period (pulse period) of the plasma gas flow rate is not particularly limited. However, when the variation period exceeds 10 Hz, the molten pool is easily disturbed to cause difficulty in obtaining a healthy welding bead. Accordingly, the variation period is preferred to be less than or equal to 10 Hz, and, more preferably, less than or equal to 3 Hz.

When the peak flow rate in a keyhole welding is less than or equal to 1 l/min, the strength of the plasma jet is insufficient to cause difficulty in performing stable keyhole welding. Also, at any thickness of plate in a non-keyhole welding, the peak flow rate greater than or equal to 3 l/min will cause substantial splash of the molten metal to easily form bubbles in the molten metal which result in breakage or a gauging state which cause difficulty in stably obtaining good quality of the welding bead. Therefore, as for the peak flow rate of the plasma gas, greater than or equal to 1 l/min is preferred in the case of keyhole welding and less than or equal to 3 l/min is preferred in the case of non-keyhole welding.

The flow rate of the plasma gas in the base flow rate is preferred to be less than or equal to 3 l/min in view of the desire to prevent blowing off and running down of the molten metal and for stability of arc during welding.

Figure 1A:
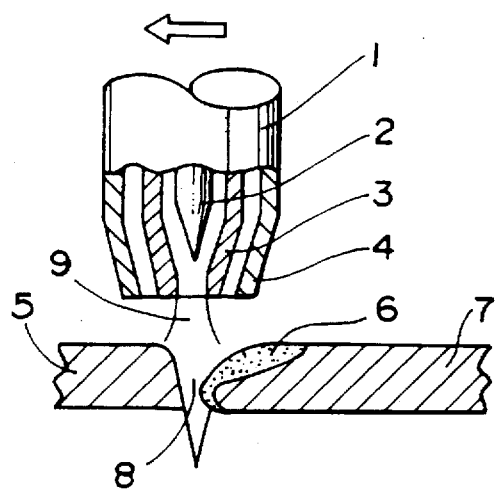
FIGS. 1A and 1B are explanatory illustrations showing activity in a keyhole welding.
Figure 1B:
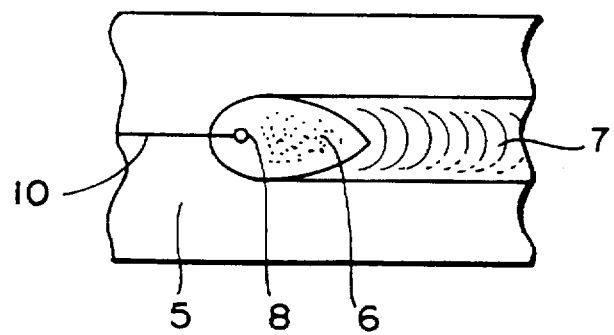
Figure 2:
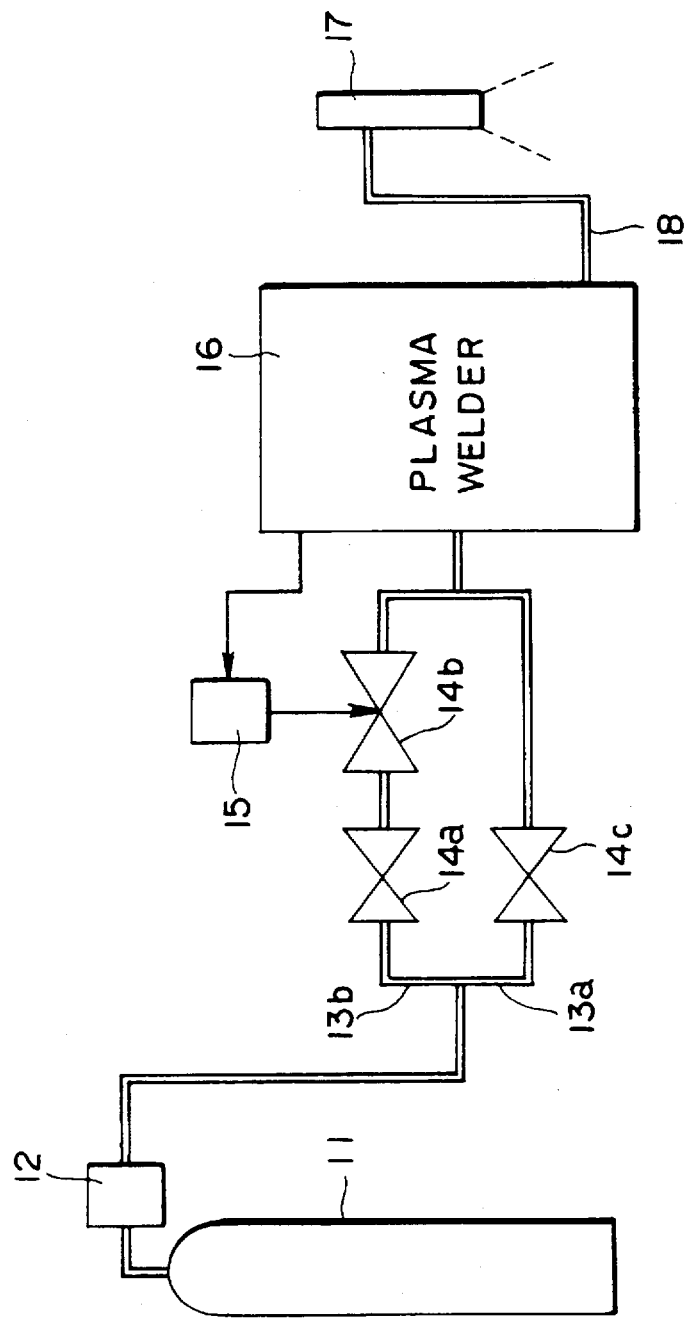
FIG. 2 is an illustration showing one example of a device for pulsating a plasma gas for cyclic variation of a plasma gas flow rate.

Various devices may be used as a device for cyclically varying the plasma gas flow rate. For instance, the mechanism illustrated in FIG. 2 is applicable.

Namely, in the conventional plasma welding apparatus, the plasma gas from a gas cylinder 11 passes a gas regulator 12 and then directly enters into a plasma welding machine 16. In the plasma welding machine 16, a hose 18 incorporating a cooling means is arranged. A welding cable is disposed through the cooling means. A welding torch 17 is connected to the plasma welding machine 16 through the hose 18. Then, the plasma gas is supplied to the welding torch 17 via the hose 18 for performing plasma welding.

In the present invention, in contrast to the conventional apparatus set forth above, between the gas regulator 12 and the plasma welding machine 16 or between the plasma welding machine and the welding torch, a piping system in which piping 13a provided therewith a base gas setting needle valve 14c and a piping 13b having a peak gas setting needle valve 14a and ON/OFF electromagnetic valve 14b provided in series are connected in parallel relationship is provided. The electromagnetic valve 14b is driven by a driving device 15 for opening and closing. The plasma welding machine 16 outputs an electric signal to the driving device 15 for controlling opening and closing of the electromagnetic valve 14b. When the electromagnetic valve 14b is driven open by the driving device 15 in response to the electric control signal from the plasma welding machine 16, both the plasma gas controlled by the flow rate of the peak gas flow setting needle valve 14a and the plasma gas controlled by the flow rate of the base gas setting needle valve 14c flow through the pipings 13b and 13a. These plasma gases join together and are supplied to the plasma gas welding machine 16, and in turn into the plasma torch 17. On the other hand, when the electromagnetic valve 14b is placed in the closed position, only plasma gas passing through the base gas setting needle valve 14c is supplied to the plasma welding machine 16 and the welding torch 17. In this case, the base flow rate of the plasma gas is supplied to the welding torch 17.

In a manner set forth above, the plasma gas varies the flow rate in pulse-like fashion. The pulse period and the pulse height can be freely varied by controlling opening and closing of the electromagnetic valve 14b. Also, opening and closing of the electromagnetic valve 14b may be controlled by detecting an arc voltage or arc current of the plasma welding machine 16 during welding operation and by outputting the control signal from the plasma welding machine 16 to the driving device 15 in relation to the result of detection.

By generating the pulsating flow of the plasma gas, the welding bead with deep penetration can be attained at any welding position without requiring large bead width.

Needless to say, other conditions for the plasma welding will not be restricted. For instance, as the plasma gas, argon gas can be used.

On the other hand, as a shield gas, argon gas, helium gas or a mixture gas mixing hydrogen or $CO_2$ with argon gas can be used. In case that cracks due to presence of hydrogen will create a problem, the amount of hydrogen should be reduced or hydrogen is to be eliminated. The welding current, welding voltage and welding speed may be appropriately determined. In addition, additives, such as filler wire and so forth may be employed.

The present invention is applicable for a plate material, such as strip, plate and so forth, pipes, tanks and so forth, even in complex configuration. Also, the invention is applicable for the materials to be welded in variety of thickness. In addition, the present invention is applicable for keyhole welding or non-keyhole welding as solely performed or in combination. Here, it should be appreciated that when a sufficient amount of welding metal can be obtained at the initial layer welding, keyhole welding is desirable. On the other hand, in case of a multi-layer welding, it is preferred to perform initial layer welding by the keyhole welding and welding for subsequent layers by the non-keyhole welding.

On the other hand, helium requires higher temperature to form plasma than argon and has a property to cause a difficulty in forming the plasma jet upon initiation of arcing. However, in case of the plasma arc welding employing helium, high arc stability and good conformability between the base material and the molten pool can be attained. In addition, since helium has approximately one tenth of the specific weight of argon, it can easily float on the molten metal.

The inventor has found that it is possible to improve arc stability, and whereby reduce defects particularly in the bottom of the welding portion by utilizing the property of the helium, in the case of difficult welding, such as circumferential welding of the stationary pipe.

As a helium gas to be employed for plasma arc welding, it should contain at least 5% to argon gas. When the content of helium gas is less than 5%, the effect of arc stability and prevention of welding defects cannot be achieved. In particular, when a mixture gas formed by adding greater than or equal to 70% of helium gas to argon gas, stability of the arc can be significantly improved and capturing of the plasma gas and so forth in the molten metal during welding can be successfully avoided while the penetration depth is somewhat reduced to permit production of welded metal having uniform bead configuration and no defect.

When the plasma gas is formulated by combination of pure helium or helium mixture gas, the stability of the plasma will not be disturbed even when the plasma gas flow rate is increased in comparison with the case where pure argon gas is used. However, when the plasma gas flow rate exceeds 15 l/min, the plasma jet becomes excessively strong to cause splashing of the molten pool or capturing of the plasma gas in the molten pool. Therefore, it is necessary to limit the plasma gas flow rate to be less than or equal to 15 l/min.

When the plasma arc welding is to be performed for the base material which is not subject pre-treatment before welding, it is preferred to use the helium gas or a mixture gas of greater than or equal to 5% of helium gas and argon gas, as the plasma gas, and to use a mixture gas formulated by mixing one or two of $CO_2$, $O_2$ and $H_2$ to one or two of argon, $N_2$ and helium, as the shield gas in order to obtain deep penetration and a non-defect welded portion even by the non-keyhole welding.

Conventionally, pure argon gas is typically used as the shield gas, since argon is inert and inexpensive. On the other hand, since helium gas has approximately one tenth of specific weight in comparison with argon, it can easily float on the molten metal. Also, nitrogen ($N_2$) is inexpensive while it is inert.

Therefore, as the shield gas, argon, $N_2$ and helium as inert gases are used solely or as a mixture.

However, when plasma arc welding is to be performed for the base material which is not subject to pre-treatment before welding, it should encounter the problem as in the case of use of pure argon gas as the shield gas, in formation of defects, such as a blow hole, within the molten metal.

Therefore, the inventor has made extensive study in the shield gas and plasma gas and found that the problem as set forth above, can be eliminated by mixing $CO_2$ gas and/or $O_2$ gas in addition to the inert gas.

This is because addition of active gas in the shield gas, the welding atmosphere is activated and stirs the molten pool to float gas and/or compound harmful to the health of the molten pool quickly to permit removal thereof.

The effect can be equally obtained even when $H_2$ gas is mixed to the shield gas. In addition, $H_2$ is effective in enhancement of straightness of the arc. Enhancement of the arc straightness means that energy density of the plasma arc is increased by restricting the arc to increase the force of the arc. It should be noted that when cracking caused by the presence of hydrogen will cause a problem, the amount of hydrogen to be added should be reduced or hydrogen is eliminated from the mixture.

When a solid wire containing one of more materials selected among Al, Ti, Zr, Si, Ni and Mn in an amount greater than or equal to 2 Wt % of the overall amount, or flux cored wire is used as a filler metal, the above mentioned effect can be further increased. When the content of these components is less than or equal to 2 Wt %, deoxidation and degassing effect can be lowered. Therefore, it is preferred that the above-mentioned component is contained in amount greater than or equal to 2 Wt %, and more preferable greater than or equal to 5 wt %.

It should be noted that Al, Ti and Zr are particularly effective in fining the molten metal structure, and Ni is effective in improvement of toughness.

While not specified, the following process is recommended in performing circumferential welding for the stationary pipe. In particular, the following process is particularly suitable for medium to large diameter pipes.

Figure 3:
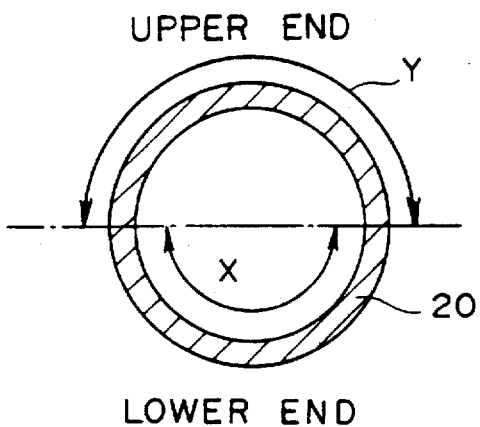
FIG. 3 is an illustration showing one example of a welding process in a circumferential welding of a stationary pipe.

The first process is for welding of the initial layer of the stationary pipes mating at ends in horizontal or tilted attitude. As shown in FIG. 3, when welding is to be performed along a welding line extending circumferentially, the welding torch is deposed within the stationary pipe to perform welding with the internal surface of the stationary pipes as the surfaces for the lower half (region X). On the other hand, for the upper half (region Y), the welding torch is arranged outside of the stationary pipe to perform welding with the external surface of the pipe as the surface.

Figure 4:
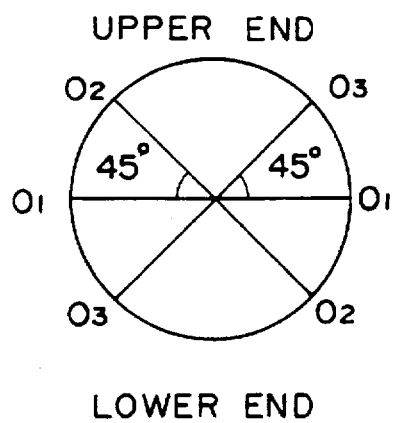
FIG. 4 is an illustration explaining upper end, lower end, upper half and lower half of the stationary pipe.

It should be noted that the upper half is a region including the upper end portion of the stationary pipe and the lower half is a region including the lower end portion of the stationary pipe. Accordingly, the boundary between the upper half and the lower half is not strictly limited at the center in the height, but can be at the position circumferentially shifted to the extent of 45° about the center of the stationary pipe, for example. As shown in FIG. 4, there are various ways for separating the upper half and the lower half, such as separating at line 01—01, line 02—02, line 03—03 and so forth. When the boundary is set at line 02—02 or 03—03 shifted from the center in the height, i.e. line 01—01, the preferred range of circumferential offset is up to 45° with respect to the horizontal line extending through the center of the stationary pipe. As shown in FIG. 3, the welding torch is arranged outside of the stationary pipe to perform welding with taking external surface of the pipe as the surface for the upper half and the welding torch is deposed within the stationary pipe to perform welding with the internal surface of the stationary pipes as the surfaces for the lower half.

As set forth above, the position of the boundary between the upper half and the lower half is not specified to the exact center in the height of the stationary pipe, where the line extending through the intersecting points with the pipe wall and the center of the stationary pipe becomes the horizontal straight line with 180° of the center angle. The center angle of the line extending through the intersecting points with the pipe wall and the center of the stationary pipe can be differentiated from 180° depending upon the necessity.

When the welding can be completed by one pass of welding operation, welding may be performed either keyhole welding or non-keyhole welding. It is also possible to simultaneously perform welding at the external surface and internal surface of the stationary pipe. In case of the multi-layer welding, it is preferred to perform all position welding for the internal surface and/or the external surface of the stationary pipe over the entire circumference of the joint.

The second process is a welding process for the stationary pipes mating in horizontal or tilted orientation, in which automatic welding is always started at the upper end portion and progressed downwardly. In this case, either keyhole welding or non-keyhole welding is applicable. In case of the multi-layer welding, even after initial welding, it is desirable to always perform welding from the upper end portion to the lower end portion.

As set forth above, by separating the stationary pipe into the lower half (region X) to perform welding at the internal surface and the upper half (region Y) to perform welding at the external surface, the welding position becomes the downward position substantially through the entire welding line with the vertical position only in the limited region. As can be clear herefrom, the shown process permits avoiding the upward position in welding and contributes to speeding up and enhancing of efficiency of the welding operation.

Various welding process and manners may be applicable for implementing the present invention.

Welding Process

As the welding process, there is no particular limitation. Namely, in addition to the welding process, in which a high energy beam, such as laser, electron beam, plasma and so forth are employed as heat source, the welding processes, such as TIG or MIG may be employed with improved welding performance.

Of course, the welding process employing the high energy bean is superior in the efficiency. In particular, the keyhole welding using the high energy beams as the heat source is preferred in view of improvement of efficiency.

Manner of Welding

The welding on the internal surface of the stationary pipe and the welding on the external surface of the stationary pipe can be performed at different times or simultaneously. When welding is performed simultaneously at the internal surface and the external surface of the stationary pipe, two welding torches are employed. This may further improve efficiency of the welding operation.

The present invention is applicable for a welding operation only on an initial layer, and for welding of the initial layer in a multi-layer welding. In case of the multi-layer welding, the welding operations for the second and subsequent layers may be performed by the all-position welding.

Needless to say, the welding condition in the welding process set forth above can be arbitrary determined. In this case, it is preferred to set the welding condition with taking the following points into account.

Figure 6A:
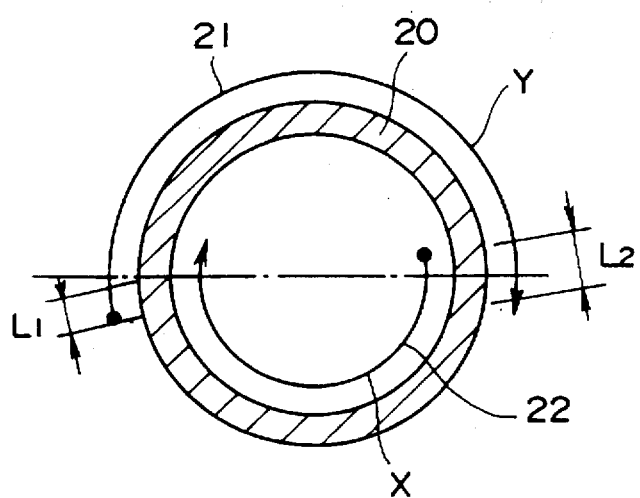
FIGS. 6A and 6B are illustrations explaining a manner of connection of the bead in welding for the stationary pipe.
Figure 6B:

In the welding operation for the stationary pipe, lowering of efficiency is caused by the portion requiring the welding operation in the upward position. Therefore, it is desirable to minimize the portion requiring the upward position welding. FIGS. 6A and 6B show the process, in which the welding is performed externally for the upper half (region Y) to form a first bead 21, and welding is performed internally for the lower half (region X) to form a second bead 22. In this case, the first and second beads 21 and 22 are overlapped at a predetermined lengths $L_1$ and $L_2$ to avoid a discontinuous portion and to complete bead connection.

The overlapping length L may be insufficient if it is less than 5 mm, while the required overlapping length may be variable depending upon the diameter of the stationary pipe, pipe wall thickness, groove configuration and so forth. In such case, difficulty is encountered in forming uniform configuration of the bead and can cause defects, such as under-cut and so forth. Therefore, in order to attain stable bead overlapping, it is desirable to set the overlapping length greater than or equal to 5 mm.

The manner of bead connection as set forth above is applicable for second and subsequent passes after completion of the keyhole welding of the initial layer, and for the all-position welding. However, in such case, it is preferred to form the overlapping portion at different angular position relative to the portion where the overlapping of the bead is formed in the preceding steps. This further ensures the welding operation.

Furthermore, even at the overlapping portion, it is desirable so as not to increase either the welding current or the plasma gas flow rate beyond the welding condition for the welding portions other than the overlapping portion. When this condition is reversed, the welding bead at the overlapping portion becomes excessively high and causes difficulty in formation of the bead in the subsequent pass in the case of the multi-layer welding. Furthermore, the excessively high bead at the overlapping portion may cause conformance failure. If necessary, it is possible to provide a lower welding speed or resting period in the overlapping portion.

On the other hand, it may be possible to improve efficiency of the welding operation by the automatic welding constantly performed from upper end and progressing downwardly. This manner will significantly improve welding efficiency.

Figure 5:
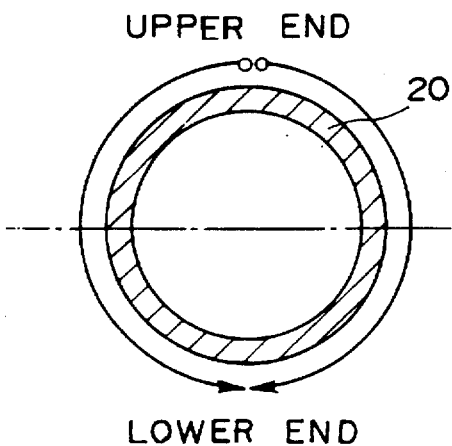
FIG. 5 is an illustration showing another example of a welding process in a circumferential welding of a stationary pipe.

The efficiency of the welding, in particular the plasma keyhole welding, is significantly lowered by the welding operation in the vertical and upward progressing of welding. The present invention permits downwardly progressing welding through the entire circumference by always starting the welding operation from the upper end and terminating the welding operation at the lower end as shown in FIG. 5. This improves the efficiency of welding. In particular, the present invention can avoid the necessity of upwardly progressing welding at the vertical position in the plasma keyhole welding to significantly improve the efficiency of the welding operation.

There are various processes and manners of welding in the welding process set forth above. However, in the process where the welding is constantly progressing downwardly from the upper end of the stationary pipe to the lower end, the welding process employing the high energy beam as the heat source is effective. In particular, in view of improvement of efficiency, keyhole welding may be suitable.

On the other hand, the welding from the upper end to the lower end of the stationary pipe may be performed at different times or simultaneously at the half and the right half of the stationary pipe. By performing the welding operation for the left and right halves simultaneously by employing two welding torches, efficiency of welding may be further improved.

The present invention is applicable for the welding operation which can be completed by only initial layer welding, and for multi-layer welding.

Needless to say, the welding condition in the welding process set forth above can be arbitrarily determined. In this case, it is preferred to set the welding condition by taking the following points into account in the case of plasma arc welding.

Figure 7:
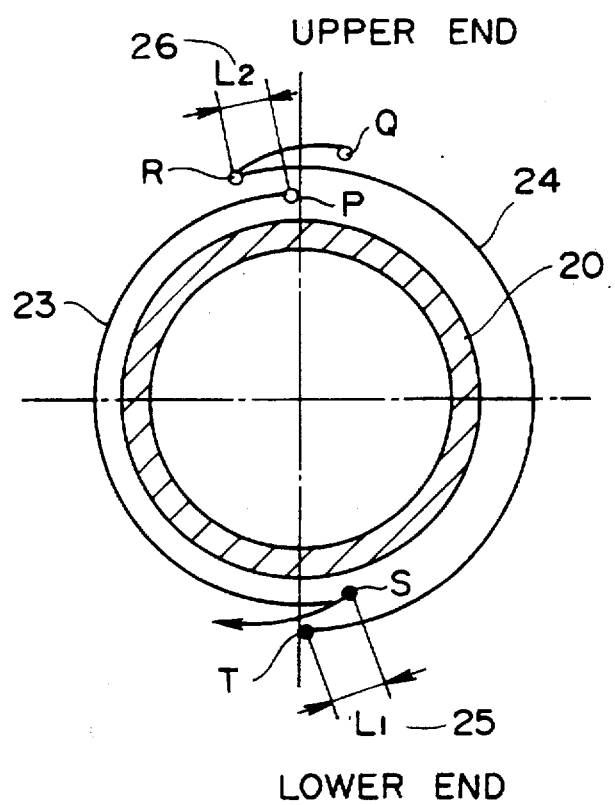
FIG. 7 is an illustration explaining a bead overlapping welding process in welding for the stationary pipe.

As shown in FIG. 7, a first bead 23 formed by downwardly progressing welding in the counterclockwise direction in the drawing and a second bead 24 formed by downwardly progressing welding in clockwise direction in the drawings are provided overlapping portions 25 and 26 to overlap each other. Overlapping welding is performed at these overlapping portions 25 and 26. By this, bead configuration can be made uniform.

The overlapping lengths L1 and L2 may be insufficient if they are less than 5 mm, while the required overlapping length may be variable depending upon the diameter of the stationary pipe, pipe wall thickness, groove configuration and so forth. In such case, difficulty is encountered in forming uniform configuration of the bead and can cause defects, such as under-cut and so forth. Therefore, in order to attain stable bead overlapping, it is desirable to set the overlapping lengths greater than or equal to 5 mm.

The downwardly progressing welding process is applicable in the case where the welding is performed on the external surface of the stationary pipe or on the internal surface thereof. In either case, where the first bead 23 and the second bead 24 are formed in a single path or tandem paths, the overlapping welding set forth above is applicable. In concrete, as shown in FIG. 7, after initiation of welding by the welding torch in the counterclockwise direction from the upper end P of the stationary pipe for forming the first bead 23, a carriage carrying a welding torch for forming the second bead 24 is slightly shifted away (moved in a counterclockwise direction) from a point Q so as not to interfere with the welding torch for forming the first bead 23. After moving back over the overlapping portion L2 at the upper end of the stationary pipe, the moving direction of the welding torch for the second bead 24 is reversed to move in a clockwise direction to initiate welding for forming the second bead 24. By this, after forming the bead overlapping at the overlapping portion L2, the second bead 24 is formed by downwardly progressing welding in the clockwise direction in series to the overlapping portion. At the lower end of the stationary pipe, the welding torch for forming the first bead 23 is not stopped at the lower end of the stationary pipe and further advanced in the magnitude corresponding to the overlapping length L1 to reach a point S. Thereafter, the welding torch for forming the first bead stops arcing. Subsequently, a carriage carrying the welding torch for the first bead 23 is retracted (moved in clockwise direction). The welding torch for the second bead 24 then reaches the lower end to complete the overlapping portion L1.

This overlapping welding method is applicable for welding process in the second and subsequent passes and in the all-position welding. In such case, it is preferred to form the overlapping portion not to cause overlapping of the overlapping portion which is formed in the preceding passes.

Furthermore, even at the overlapping portion, it is desirable so as not to increase either the welding current or the plasma gas flow rate beyond the welding condition for the welding portions other than the overlapping portion. When this condition is reversed, the welding bead at the overlapping portion becomes excessively high and cause difficulty in formation of the bead in the subsequent pass in the case of the multi-layer welding. Furthermore, the excessively high bead at the overlapping portion may cause conformance failure. If necessary, it is possible to provide a lower welding speed or resting period in the overlapping portion.

Figure 8:
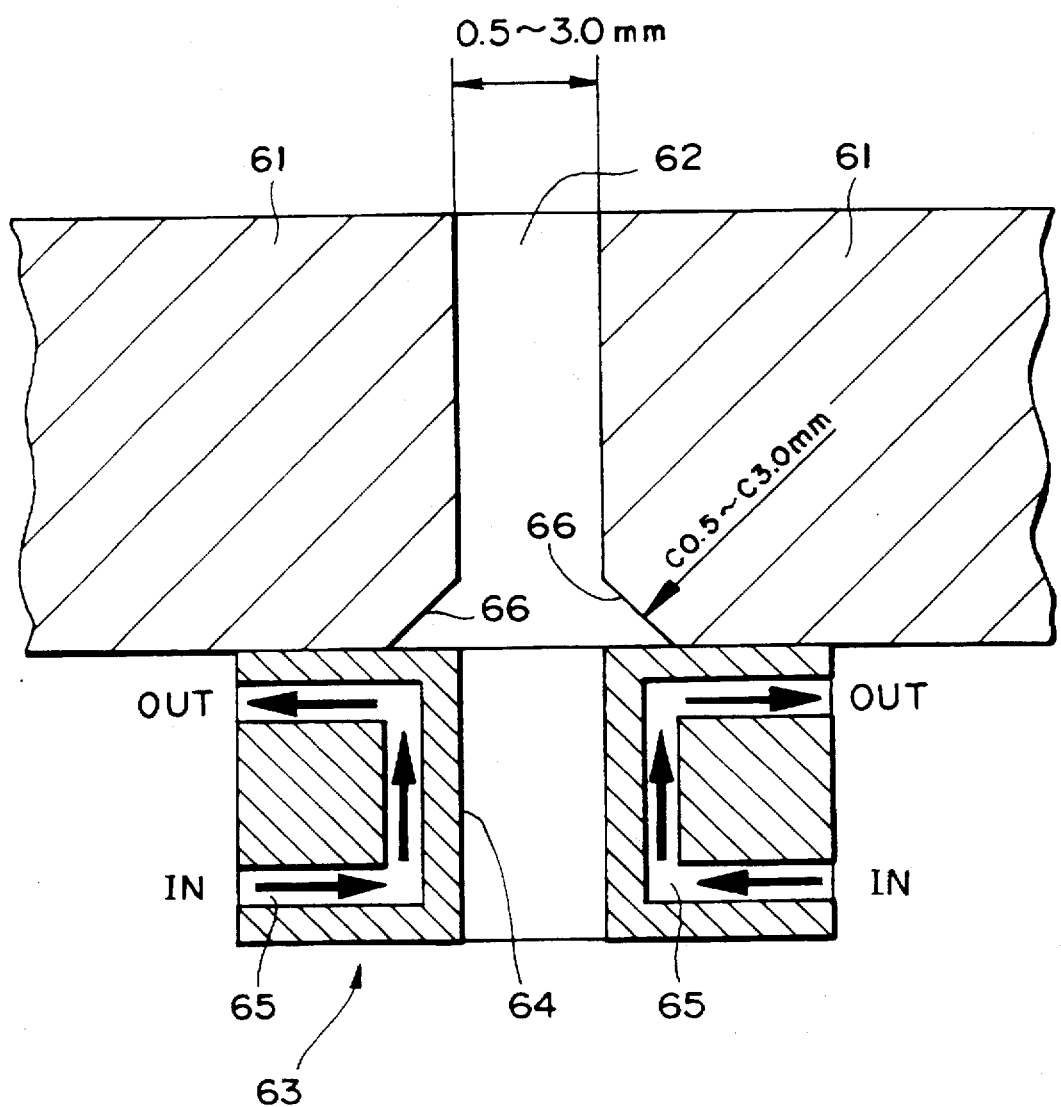
FIG. 8 is an illustration showing a plasma keyhole welding process employing a backing plate.

In the plasma key hole welding, stable and high efficiency welding can be achieved by using a backing material. FIG. 8 shows a plasma keyhole welding process employing the backing material. In FIG. 8, a pipe as a base material 61 is processed vertically at the mating end. A pair of base materials 61 are mated at the mating end with maintaining a small gap therebetween to define a route gap 62. The route gap 62 may be in the width of 0.5 to 5.0 mm. A backing member 63 is a steel block internally defining a cooling water passage 65. Cooling water is circulated through the passage 65 for cooling the backing member 63. The backing member 63 is formed with a slit 64 of the width greater than or equal to 3 mm at the center thereof. The backing member 63 is arranged by placing the slit 64 in alignment with the route gap 62. It should be noted that the backing member 63 is tightly fitted onto the base material 61 so as to attain good heat transmission from the base material 61 to the backing member 63. At the mating ends of the base materials, a chamfer 66 of C0.5 to C3.0 is provided at the edge portions at the backside of the groove.

As shown in FIG. 8, by providing the chamfer 66, the molten pool is expanded in the lateral direction, i.e. the direction along the back side of the base material. Associating therewith, the bead to be formed is widened. By expansion of the bead width, the height of the penetration bead can be suppressed to be lower than that of the case where no chamfer is provided. By this, stability of welding is increased to provide high quality welding bead.

On the other hand, even in the case where the backing member is not employed, providing the chamfer 66 on the edge portion at the back side of the base member to be welded as shown in FIG. 8 is effective in preventing disturbance of the plasma arc. Namely, as shown in FIG. 8, by providing the chamfer of C0.5 to C3.0 at the edge portion at the backside of the base material, effects of (1) uniform alignment of the penetration bead, (2) suppression of the penetration bead, (3) increasing of surface tension and (4) cooling effect for the penetration bead can be attained.

The plasma arc passes through the pipe in the wall thickness direction as a high temperature and high velocity energy pillar. However, during the period until the keyhole is formed, the plasma arc tends to be in the blocking condition. Since the plasma arc is abruptly flushed after formation of the keyhole, disturbance of the arc can be induced. By providing the chamfer at the backside of the base material to be welded, disturbance of the arc at the flushing can be suppressed. Also, the velocity of the plasma arc injected at high velocity can be decelerated at the portion of the chamfer 66 to regulate the arc per se.

On the other hand, the chamfer 66 is also effective for shaping and cooling the molten pool before formation of the penetration bead. In case that the chamber is not provided, the width of the penetration bead is narrow and the reinforcement (reinforcement of the penetration bead) becomes high. In contrast to this, by providing the chamfer, the width of the penetration bead is widened and height is reduced.

Namely, the region to stay in the molten pool as the volume for the penetration bead becomes significantly large by providing the chamfer to permit widening of the bead per se. As a result, the area to contact with the base material can be widened. By this, increasing of the molten pool cooling-effect and increasing of the surface tension can be achieved to contribute to formation of good shape of the penetration bead.

Furthermore, upon welding, by weaving the welding torch the lateral direction, stable plasma keyhole welding can be achieved even for thick base material. Namely, by weaving or swinging the welding torch in the direction perpendicular to the groove line (welding line), the plasma arc is waved. By waving of the plasma arc, deeper penetration can be achieved in comparison with the case where waving of the plasma arc is not affected, at the equal strength of the plasma arc 14. The preferred frequency of waving is 0.5 to 10 Hz, and more preferably in a range of 2 to 5 Hz.

By providing waving for the plasma arc passing through the thick plate, the side wall of the base material at the side of the keyhole can be sufficiently heated to improve wettability so as to provide higher stability in keyhole welding.

On the other hand, the molten pool formed at the backside of the plasma arc is widened in the range to deposit on the base material in comparison with the case where no weaving is effected. As a result, improvement of the molten pool cooling efficiency and increasing of the surface tension can be achieved.

As set forth above, by swinging the welding torch to cause waving of the plasma arc, thick wall welding and high speed welding becomes possible with lesser heat input. Therefore, waving of the plasma arc is effective in all position welding of the stationary pipes in a pipe line and so forth.

Next, the preferred embodiments of the present invention will be discussed with comparison to comparative examples. As for these embodiments, filler wires were supplied except in the case of the first embodiment and for some examples and comparative examples in the fifth embodiment.

First Embodiment

Figure 9:
FIG. 9 is a section showing a joint configuration in the first embodiment.
Figure 10:
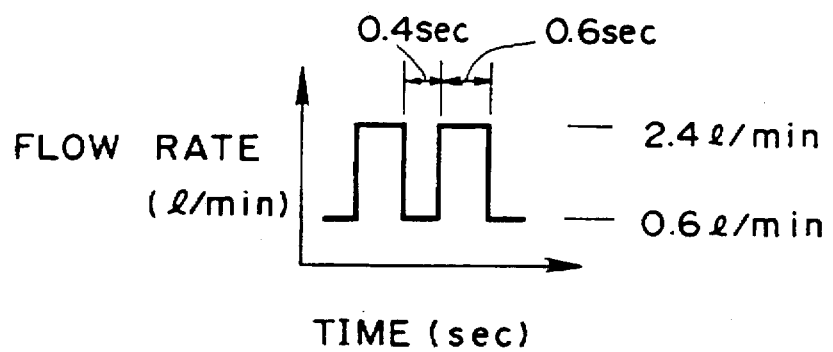
FIG. 10 is an illustration showing variation of the plasma gas flow rate in the first example.

This embodiment is an example for application to the all-position welding for relatively small diameter pipe, having an external diameter of 216 mm. The groove was selected to be an I groove (FIG. 9). One pass of welding was performed under the welding condition shown in the following Table 1. As shown in FIG. 10, the peak flow rate of the plasma gas was set at 2.4 l/min, the base flow rate was set at 0.6 l/min, so that plasma arc became strong to form the keyhole at the peak flow rate and higher solidification speed was attained for promoting formation of the bead in the base flow rate. The pulsation period of alternating the peak flow rate and the base flow rate was 1 Hz. The base material to apply the welding process was JIS G3452 200A (external diameter 216 mm, wall thickness 6 mm).

TABLE 1

| Welding Process | Current (A) | Voltage (V) | Average Welding Speed (cpm) | Plasma Gas | Shield Gas |
|---|---|---|---|---|---|
| Plasma Keyhole All Position Welding | 100–120 | 28–34 | 12 | Argon Flow rate: see FIG. 9 | Argon (Contain 4–7% of hydrogen) |

Second Embodiment

Figure 11:
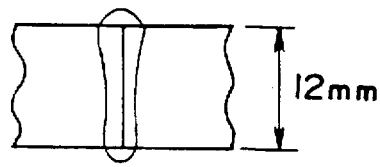
FIG. 11 is a section showing a joint configuration in the second embodiment.
Figure 12:
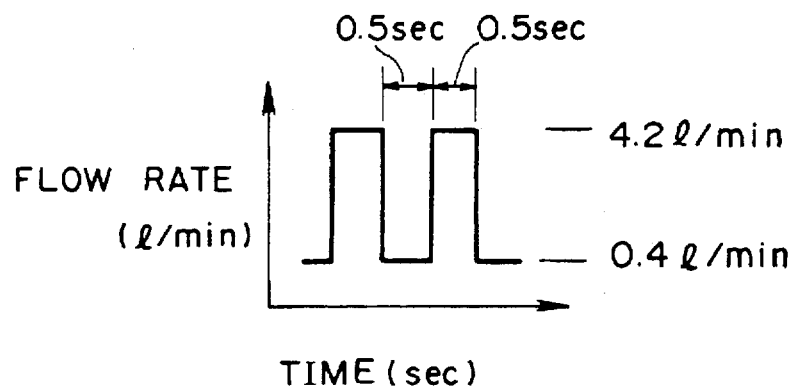
FIG. 12 is an illustration showing variation of the plasma gas flow rate in the second example.

The shown embodiment is an example of performing one-pass welding for an I groove (FIG. 11) of thickness 12 mm of the base material. The welding condition is shown in the following Table 2. As shown in FIG. 12, relative to 0.4 l/m in the base flow rate, the plasma gas flow rate at the peak flow rate was set at 4.2 l/min to obtain strong plasma arc. The switching frequency was relatively low, i.e. 1 Hz, to facilitate formation of the bead. The welding process was applied for the base material of JIS SM490 (plate thickness 12 mm).

TABLE 2

| Welding Process | Welding Position | Current (A) | Voltage (V) | Average Welding Speed (cpm) | Plasma Gas | Shield Gas |
|---|---|---|---|---|---|---|
| Plasma Keyhole Welding | Downward | 200–240 | 36–38 | 14 | Argon Flow Rate: see FIG. A4 | Argon (Containing 4–7% of hydrogen) |

Third Embodiment

Figure 13:
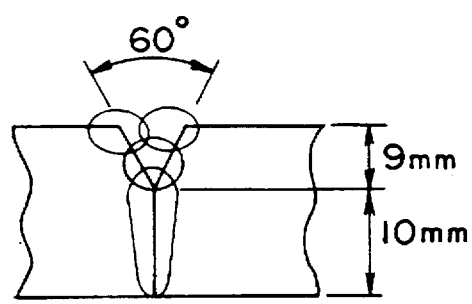
FIG. 13 is a section showing a joint configuration in the third embodiment.

This embodiment is an example in which the keyhole welding and non-keyhole welding are selectively performed by controlling the plasma gas. The welding condition is shown in the following Table 3. With respect to the pipe of 30 inch (76.2 cm) diameter, the groove is selected to be a Y-groove (FIG. 13), multi-layer welding was performed by performing the keyhole welding at the first pass with increased plasma gas flow rate Pmax at relatively high current side and by performing the non-keyhole welding at the second and subsequent passes with controlling the plasma gas at lower level. The process was applied for the base material of API5L-X65 (pipe diameter 30 inch, wall thickness 19 mm).

TABLE 3

Figure 14:
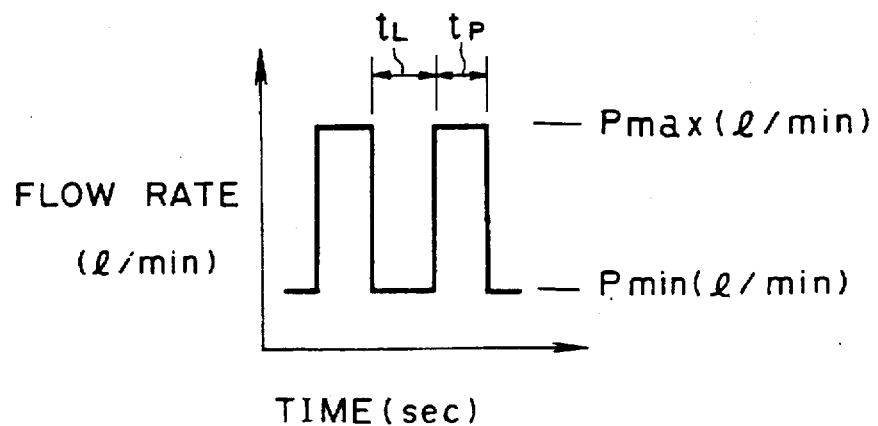
FIG. 14 is an illustration showing variation of the plasma gas flow rate in the third example.

| Welding Process | Welding Position | Pass | Current (A) | Voltage (V) | Average Welding Speed (cpm) | Plasma Gas Argon (see FIG. 14) | | | | Shield Gas |
|---|---|---|---|---|---|---|---|---|---|---|
| | | | | | | Pmax l/min | Pmin l/min | $t_L$ sec | $t_P$ sec | |
| Plasma Keyhole Welding + Plasma Non-keyhole Welding | All Position Welding | 1st Pass Keyhole | 240–290 | 38–39 | 15 | 2.6 | 0.5 | 0.8 | 0.5 | Argon (containing 4–7% of Hydrogen) |
| | | 2nd Pass Non-Keyhole | 190–220 | 37–39 | 15 | 0.6 | 0.3 | 1 | 1 | |
| | | 3rd Pass Non-Keyhole | 140–160 | 36–38 | 17 | 0.6 | 0.3 | 0.5 | 1 | |
| | | 4th Pass Non-Keyhole | 140–160 | 36–38 | 17 | 0.6 | 0.3 | 0.5 | 1 | |

It should be noted that, in each embodiment, stable welding could be performed. The resultant bead configuration was good, and no defect was found.

As set forth in detail, according to the present invention, since the plasma gas flow rate is varied cyclically, the process is applicable for welding of various configurations and thicknesses of base materials. In particular, the welding process according to the present invention can provide deep penetration at the welding portion and high efficiency without causing drooping down of the molten pool or projecting of the bead.

In particular, in the foregoing third embodiment, in the keyhole welding in the first pass, another welding was performed with maintaining other conditions the same as those shown in the foregoing Table 3, maintaining the arc voltage at 30–32 by the arc length control. Good quality of bead uniformly having reinforcement of weld could be obtained even at the upward position in the vicinity of the lower end of the stationary pipe while the penetration bead height was at approximately the same height to the backside of the base material in the prior art.

Fourth Embodiment

Under the condition shown in the following Table 4, the circumferential welding was performed by way of plasma arc welding. The results of checking of workability in welding operation and defects in the welding portion are shown in the following Table 5.

TABLE 4

| Welding Current (A) | Welding Speed (cm/min) | Electrode Diameter (mm) | Kind of Base Material (thickness) | Diameter of Stationary Pipe | Groove Configuration | Remarks |
|---|---|---|---|---|---|---|
| 280/330 | 10–15 | 4.8 | API 5L-X60 (19 mm) | 20 in | Y groove Route Face 10 mm | Welding is only one pass for initial layer |

TABLE 5

Figure 15:
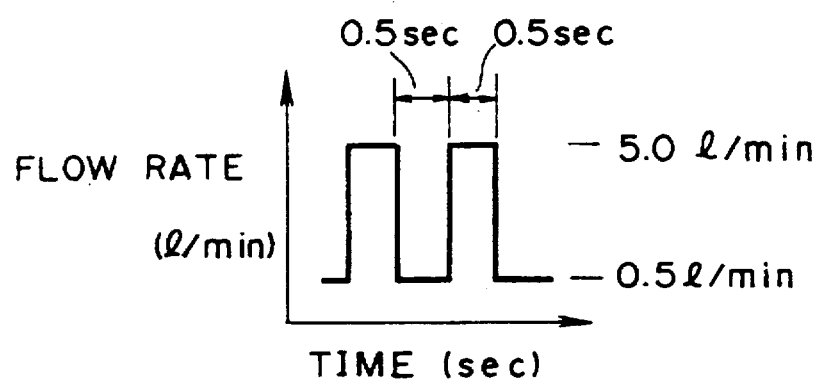
FIG. 15 is an illustration showing pulsation of the plasma gas flow.
Figure 16:
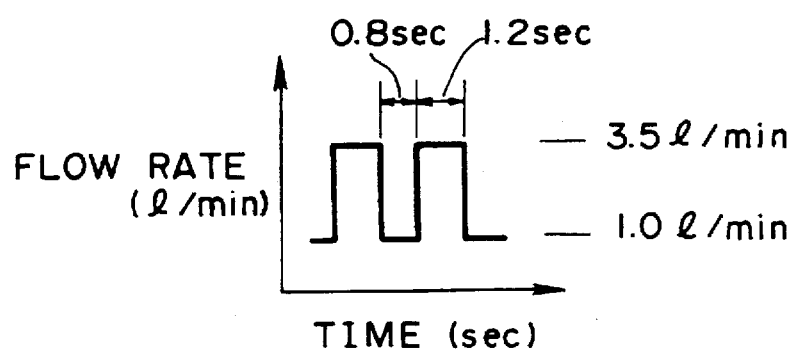
FIG. 16 is an illustration showing pulsation of the plasma gas flow.

| | | Welding Process | Kind and Flow Rate of Plasma Gas (l/min) | | Kind and Flow Rate of Shield Gas (l/min) | | X Ray inspection | Remarks |
|---|---|---|---|---|---|---|---|---|
| Comparative Example | 1 | A | Ar | | 0.9 | Ar - 7% Hydrogen | 15 x | |
| | 2 | B | Ar | | 2.0 " | | 15 x | |
| | 3 | A | Ar–2% He | | 2.0 " | | 15 Δ | |
| | 4 | A | He—45% Ar | | 18.0 " | | 10 x | Non-Uniform Bead Configuration Many Under-cut occurs |
| | 5 | A | Ar | | 8.0 " | | 15 — | Welding Impossible |
| | 6 | A | Ar | | 4.5 " | | 15 x | Bad bead Appearance |
| Example | 7 | A | He | | 0.5 | Ar - 7% Hydrogen | 15 o | |
| | 8 | A | He | | 2.2 " | | 15 o | |
| | 9 | A | He | | 6.0 | Ar - 4% Hydrogen | 12 o | |
| | 10 | A | He—70% Ar | | 2.6 " | | 12 o | |
| | 11 | B | He—50% Ar | | 3.5 " | | 15 o | |
| | 12 | A | He—25% Ar | | 1.5 " | | 15 o | Arc further stable |
| | 13 | B | He—20% Ar | | 13.0 " | | 15 o | Keyhole welding |
| | 14 | A | He—50% Ar Pulsate gas at 1 Hz He—10% Ar | | 0.5/0.5 " 1.0/3.5 | | 15 o | Gas flow rate: FIG. 15 |
| | 15 | A | Pulsate gas at 0.5 Hz | | " | | 15 o | Gas flow rate: FIG. 16 |

It should be noted that among the welding process in the foregoing table, A process is a method for welding the inside of the stationary pipe for the lower half of the stationary pipe and welding the outside of the stationary pipe for the upper half thereof along the circumferentially extending welding line of the stationary pipe (FIG. 3). The B process is a method to perform automatic welding to progress welding constantly from the upper end of the stationary pipe to the lower end thereof (FIG. 5).

As is clear, comparative examples Nos. 1 2, 5 and 6 are examples employing pure argon gas as the plasma gas. A lot of blow holes are created in the bottom of the welded metal, possibly by capturing of the plasma gas. Also, the comparative example No. 3 had the blow hole due to too small a mixture rate of helium. The comparative example No. 4 contained the welding defect due to excessive of plasma gas flow rate while the mixture rate of the helium was appropriate.

On the other hand, the excellent welding portion having no defect could obtained in all of the examples of the present invention. Since helium or the mixture gas containing an appropriate rate of helium gas was used as the plasma gas, the plasma gas would easily float up even once captured and would not reside in the molten metal. Therefore, the defect in the bottom of the welding portion which has been the problem in the prior art, can be successfully prevented.

As set out in detail, the welding process according to the present invention, can provide a stable arc and an excellent welding portion with no welding defect at high efficiency, particularly in the circumferential welding of horizontally oriented stationary pipe.

Fifth Embodiment

The plasma arc welding was performed for a steel plate under the condition indicated in the following Table 6. The results of checking of the workability and defect in the welding portion are shown in the following Table 7.

TABLE 6

| Welding Current (A) | Welding Speed (cm/min) | Electrode Diameter (mm) | Kind of Base Material (thickness mm) | Welding Position | Groove Configuration |
| --- | --- | --- | --- | --- | --- |
| 280–340 | 15 | 4.8 | SM490A (thickness 12 mm) | Downward | I Groove (Steel surface is maintained as skin) |
| 250–290 | 15 | | | Sideward | |

TABLE 7

| | No. | Kind and Flow Rate of Plasma Gas (l/min) | | Kind and Flow Rate of Shield Gas (l/min) | Chemical Composition of Filler Material (Wt %) | | | | | | | X-Ray Inspection * | Remarks |
| --- | --- | --- | --- | --- | --- | --- | --- | --- | --- | --- | --- | --- | --- |
| | | | | | Al | Ti | Zr | Si | Mn | Other | Balance | | |
| Comparative Example | 1 | Ar | 0.8 | Ar – 7% Hydrogen | 15 | | | | Filler Material not used | | | x | |
| | 2 | Ar Pulsate at 15 Hz | 0.5/2.5 | " | 15 | | | | | | | x | Many under-cut occurs |
| | 3 | Ar | 4.0 | " | 15 | | | | | | | x | many blow holes occurs at bottom of bead |
| | 4 | Ar—3% He | 2.0 | " | 15 | | | | | | | x | |
| | 5 | Ar | 2.5 | " | 15 | 1.0 | — | — | 0.1 | 0.2 | — | Fe | x | |
| | 6 | Ar | 0.9 | " | 15 | 0.2 | 0.3 | — | 0.4 | 0.5 | — | Fe | Δ | 0° C. Charpy Impact Value: 48J (average value of three samples) |
| Example | 7 | He | 1.5 | Ar—10% CO$_2$ | 15 | | | | Filler Material not used | | | o | Arc stable |
| | 8 | He—90% Ar | 2.5 | Ar—2% O$_2$ | 15 | | | | | | | o | |
| | 9 | He—50% Ar | 2.5 | Ar—5% He—5% CO$_2$ | 15 | | | | | | | o | |
| | 10 | He—10% Ar | 3.5 | Ar—7% H$_2$ | 15 | | | | | | | o | Arc stable |
| | 11 | He—20% Ar | 3.5 | Ar—50% N$_2$—2% O$_2$ | 15 | | | | | | | o | Arc stable |
| | 12 | He | 5.8 | Ar—30% N$_2$—10% CO$_2$—2% O$_2$ | 15 | 1.5 | — | — | 0.4 | 1.8 | — | Fe | o | Arc stable |
| | 13 | He—50% Ar | 2.0 | Ar—10% He—5% CO$_2$—2% O$_2$ | 15 | 1.0 | 0.3 | — | 0.2 | 1.0 | Slag forming agent 10 | Fe | o | Wire is FCW |
| | 14 | He—50% Ar | 4.8 | Ar—10% He—5% CO$_2$—2% O$_2$ | 15 | 1.0 | 0.3 | 0.2 | 0.3 | 0.9 | — | Fe | o | |
| | 15 | He—90% Ar | 3.0 | Ar—7% H$_2$ | 15 | 1.0 | 0.3 | — | 0.3 | 1.2 | Ni: 0.5 | Fe | o | 0° C. Charpy Impact Value: 122J (average value of three samples) |

* NOTE: x denotes "Defect", Δ denotes "Defect but little", and o denotes "No Defect".

As can be clear from the foregoing Table 7, the comparative examples causes defects in the welding portion and cannot obtain the sound welded metal. On the other hand, the examples of the present invention is superior in stability of the arc and can provide sound welded metal with no defect.

As set forth above, according to the present invention, when the plasma arc welding is to be performed for the base material which is not processed through preparation, the welding portion with deep penetration and no defect can be obtained even by the non-keyhole welding.

Figure 17:
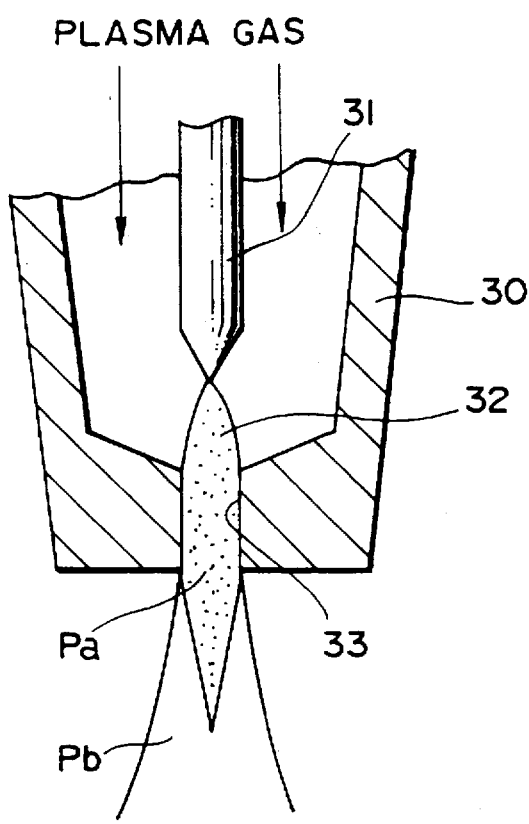
FIG. 17 is a section showing a manner of generation of a plasma arc.

As shown in FIG. 17, an injection hole 33 at the tip end of a plasma restriction nozzle 30, in which a non-consumable electrode 31, such as that made of tungsten or tungsten with rare earth metals like Th, La and Y, is disposed at the center portion, converges the plasma. The arc 32 generated from the electrode 31 forms the plasma of the plasma gas (working gas). The plasma then passes the injection opening 33 of the restriction nozzle 30 to become the high density plasma arc 32. The plasma arc 32 can be roughly separated at a portion $P_a$ at the center portion and being said to have the temperature over 10000° C., and peripheral relatively lower temperature portion $P_b$.

Figure 18:
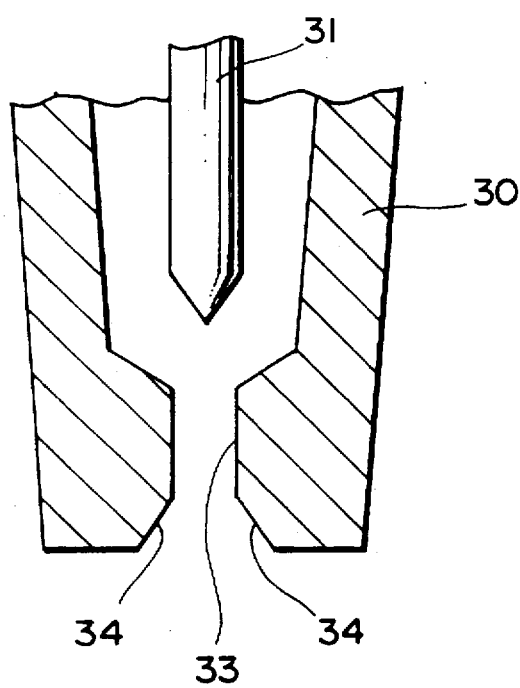
FIG. 18 is a section showing one example of a restricting nozzle configuration in the present invention.

In case of the plasma keyhole welding, the portion directly contributing to formation of the keyhole is the central high temperature portion $P_a$. The peripheral portion $P_b$ mainly serves for widening the width of the molten metal by melting the portion near the surface and does not significantly contribute to penetration. Accordingly, in the keyhole welding, it is desirable to reduce the ratio of the portion $P_b$ as small as possible. Therefore, as shown in FIG. 18, it is effective to provide a chamfer 34 at the injection hole 33 at the tip end of the restriction nozzle 30. The chamfer of C0.5 to 4.0 is preferred in this case.

Furthermore, when a ceramic coating is provided at the tip end of the nozzle, so-called series arc phenomenon which tends to be caused when the arc length is held short to cause parallel arc from the portion other than the nozzle hole, can be successfully avoided. Moreover, overheating of the nozzle by the influence of heat radiation during welding can be also avoided. Therefore, providing a ceramic coating should contribute to stabilization of the arc and for expansion of the life of the nozzle.

Sixth Embodiment

This embodiment is an example of all-position welding from both inner and outer sides of the stationary pipe after inial layer welding by way of plasma arc welding.

Figure 19:
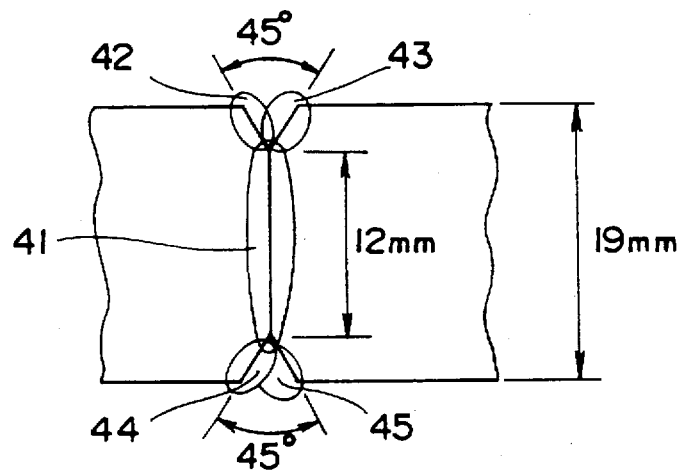
FIG. 19 is a section showing configuration of the joint and the manner of formation of layers in the sixth embodiment.

The initial layer welding was performed simultaneously on the inner periphery for the lower half of the stationary pipe and on the outer periphery for the upper half thereof for the groove at the joint of the stationary pipes as shown in FIG. 19. In FIG. 19, a bead 41 is the initial layer. Subsequently, the second and third layers are formed on both the inner periphery and the outer periphery by way of non-keyhole welding. In the drawing, the reference numerals 42 and 43 denote external beads, and reference numerals 44 and 45 denote internal beads.

Here, the sample base material was API 5L-X60 steel (thickness 19 mm) of 20 inches in pipe diameter. The plasma arc welding conditions are shown in the following Table 8.

Seventh Embodiment

This embodiment shows an example of all-position welding at both of the inner and outer peripheries of the stationary pipe after initial layer welding by the laser welding.

Figure 20:
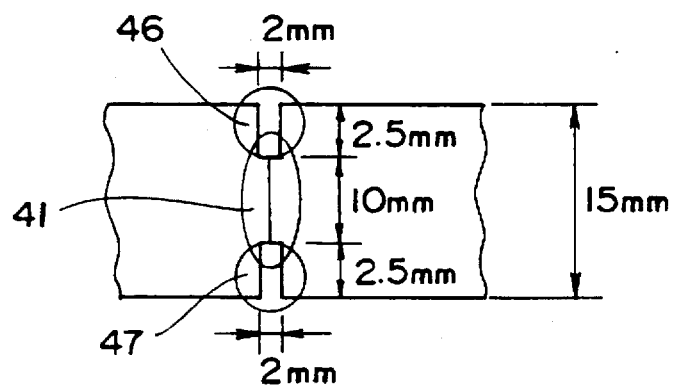
FIG. 20 is a section showing configuration of the joint and the manner of formation of layers in the seventh embodiment.

The initial layer welding was performed simultaneously on the inner periphery for the lower half of the stationary pipe and on the outer periphery for the upper half thereof for the groove at the joint of the stationary pipes as shown in FIG. 20. In FIG. 20, a bead 41 is the initial layer. Subsequently, the second and third layers are formed on both of the inner periphery and the outer periphery by way of non-keyhole welding. In the drawing, the reference numeral 46 denotes external beads, and reference numeral 47 denotes internal beads.

Here, the sample base material was API 5L-X60 steel (thickness 15 mm) of 20 inches in pipe diameter. The laser arc welding conditions are shown in the following Table 9.

TABLE 9

| Distinction | Output (kW) | Speed (cm/min) | Shield Gas | Assist gas |
|---|---|---|---|---|
| 1st Pass | 10 | 60 | helium | helium |
| 2nd and 3rd Pass | 5 | 60 | helium | helium |

Eighth Embodiment

This embodiment shows an example of all-position welding at the outer peripheries of the stationary pipe after initial layer welding by the plasma welding.

Figure 21:
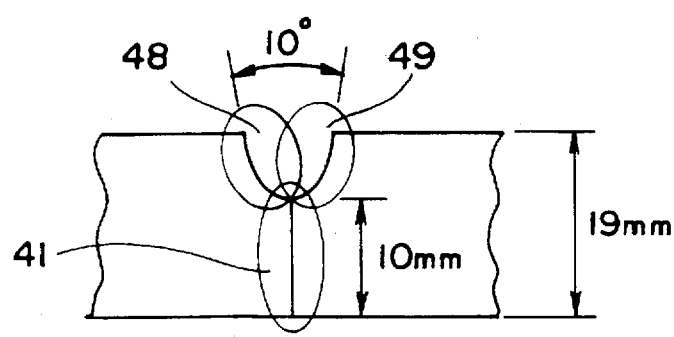
FIG. 21 is a section showing configuration of the joint and the manner of formation of layers in the eighth embodiment.

The initial layer welding was performed simultaneously on the inner periphery for the lower half of the stationary pipe and on the outer periphery for the upper half thereof for the groove (a Y-groove having opening at external side) at the joint of the stationary pipes as shown in FIG. 21. In FIG. 21, a bead 41 is the initial layer. Subsequently, the second and third layers are formed on both of the inner periphery and the outer periphery by way of non-keyhole welding. In the drawing, the reference numerals 47 and 48 denote external beads.

Here, the sample base material was API 5L-X60 steel (thickness 19 mm) of 20 inches of pipe diameter. The plasma arc welding conditions are shown in the following Table 10.

TABLE 8

| Distinction | Welding Process | Current (A) | Voltage (V) | Speed (cm/min) | Plasma Gas | Shield Gas |
|---|---|---|---|---|---|---|
| 1st Pass | Keyhole | 320 | 38 | 20 | Argon | Argon (containing 4~7% of Hydrogen) |
| 2nd and 3rd Pass | Non-keyhole | 220 | 30 | 30 | Argon | |

TABLE 10

| Distinction | Welding Process | Current (A) | Voltage (V) | Speed (cm/min) | Plasma Gas | Shield Gas |
|---|---|---|---|---|---|---|
| 1st Pass | Keyhole | 320–340 | 32–34 | 18 | Argon | Argon + Hydrogen |
| 2nd and 3rd Pass | Non-keyhole | 260–280 | 30–32 | 22 | Argon | |

Ninth Embodiment

This embodiment shows an example of all-position welding at the inner peripheries of the stationary pipe after initial layer welding by the laser welding.

Figure 22:
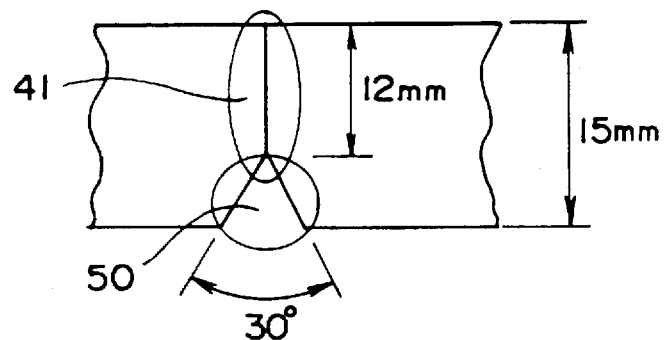
FIG. 22 is a section showing configuration of the joint and the manner of formation of layers in the ninth embodiment.

The initial layer welding was performed simultaneously on the inner periphery for the lower half of the stationary pipe and on the outer periphery for the upper half thereof for the groove (a Y-groove) having opening at internal side) at the joint in the stationary pipes as shown in FIG. 22. In FIG. 22, a bead 41 is the initial layer. Subsequently, the second and third layers are formed on both of the inner periphery and the outer periphery by way of non-keyhole welding. In the drawing, the reference numeral 50 denotes internal beads.

Here, the sample base material was API 5L-X60 steel (thickness 19 mm) of 30 inches of pipe diameter. The plasma arc welding conditions are shown in the following Table 11.

TABLE 11

| Distinction | Welding Process | Current (A) | Voltage (V) | Speed (cm/min) | Plasma Gas | Shield Gas |
|---|---|---|---|---|---|---|
| 1st Pass | Keyhole | 300–320 | 32–35 | 18 | Argon | Argon + Hydrogen |
| 2nd and 3rd Pass | Non-keyhole | 280–300 | 30 | 22 | Argon | |

Tenth Example

This embodiment is an example, in which welding of the stationary pipe is completed only by the initial layer welding by way of the plasma arc welding process.

Figure 23:
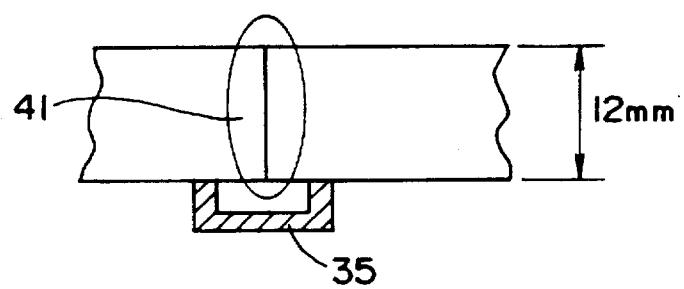
FIG. 23 is a section showing configuration of the joint and the manner of formation of layers in the tenth embodiment.

The initial layer welding was performed simultaneously on the inner periphery for the lower half of the stationary pipe and on the outer periphery for the upper half thereof with employing the backing material (of Cu or ceramic) for the groove (an I-groove) at the joint of the stationary pipes as shown in FIG. 23. In FIG. 23, a bead 41 is the initial layer.

Here, the sample base material was API 5L-X60 steel (thickness 12 mm) of 20 inches in pipe diameter. The plasma arc welding conditions are shown in the following Table 12. Since breakage tends to be caused when the amount of hydrogen is excessive, hydrogen is not used as the shield gas.

TABLE 12

| Distinction | Welding Process | Current (A) | Voltage (V) | Speed (cm/min) | Plasma Gas | Shield Gas |
|---|---|---|---|---|---|---|
| 1st Pass | Keyhole | 300–320 | 33–34 | 14 | Argon | Argon + $CO_2$ |

Eleventh Embodiment

This embodiment shows an example of all-position welding at the inner peripheries of the stationary pipe after initial layer welding by the laser welding.

Figure 24:
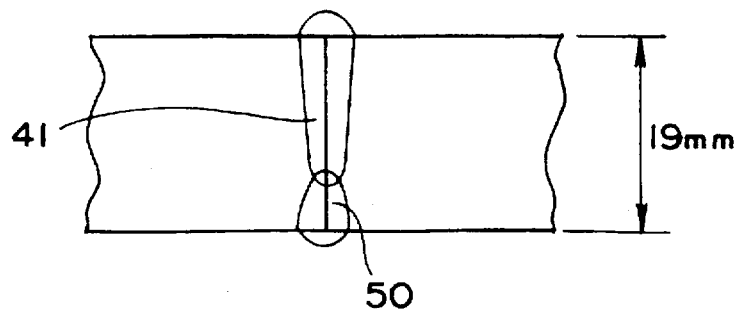
FIG. 24 is a section showing configuration of the joint and the manner of formation of layers in the eleventh embodiment.

The initial layer welding was performed simultaneously on the inner periphery for the lower half of the stationary pipe and on the outer periphery for the upper half thereof for the groove (an I-groove) at the joint of the stationary pipes as shown in FIG. 24. In FIG. 24, a bead 41 is the initial layer. Subsequently, the second layer is formed on both of the inner periphery and the outer periphery by way of non-keyhole welding. In the drawing, the reference numeral 50 denotes internal beads.

Here, the sample base material was API 5L-X60 steel (thickness 19 mm) of 30 inches in pipe diameter. The plasma arc welding conditions are shown in the following Table 13.

TABLE 13

| Distinction | Welding Process | Current (A) | Voltage (V) | Speed (cm/min) | Plasma Gas | Shield Gas |
|---|---|---|---|---|---|---|
| 1st Pass | Non-Keyhole | 280–320 | 30–33 | 16–18 | Argon | Argon + Hydrogen |
| 2nd Pass | Non-keyhole | 240–270 | 29–32 | 18–20 | Argon | |

Twelfth Example

This embodiment is an example, in which welding of the stationary pipe is completed only by the initial layer welding by way of the plasma arc welding process. This embodiment is suitable for welding pipes having relatively thin wall for a pipe line.

Figure 25:
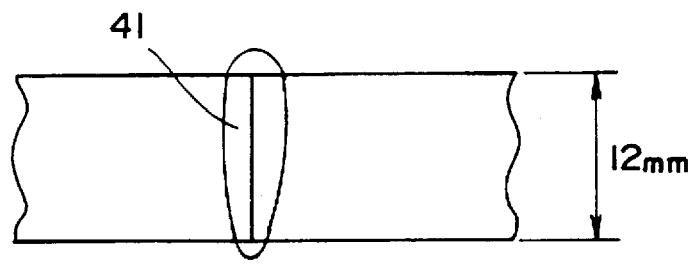
FIG. 25 is a section showing configuration of the joint and the manner of formation of layers in the twelfth embodiment.

The initial layer welding was performed simultaneously on the inner periphery for the lower half of the stationary pipe and on the outer periphery for the upper half thereof without employing the backing material for the groove (an I groove) at the joint of the stationary pipes as shown in FIG. 25. In FIG. 25, a bead 41 is the initial layer. Here, the sample base material was API 5L-X60 steel (thickness 10 mm) of 20 inches in pipe diameter. The plasma arc welding conditions are shown in the following Table 14.

TABLE 14

| Distinction | Welding Process | Current (A) | Voltage (V) | Speed (cm/min) | Plasma Gas | Shield Gas |
|---|---|---|---|---|---|---|
| 1st Pass | Keyhole | Pulse of 200/280 | 33–38 | 10 | Argon | Argon + Hydrogen |

Thirteenth Embodiment

Figure 26:
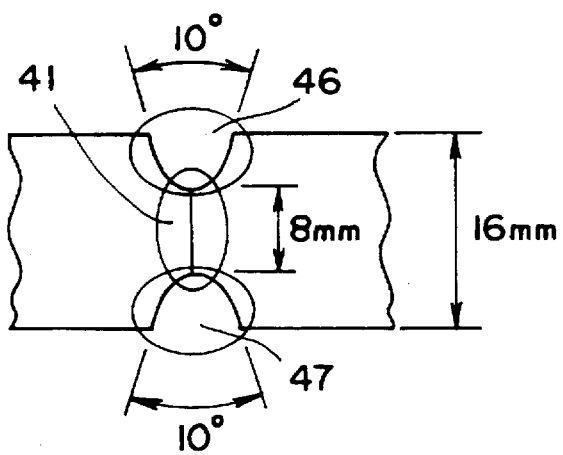
FIG. 26 is a section showing configuration of the joint and the manner of formation of layers in the thirteenth embodiment.

This embodiment is an example, in which the all-position welding is performed for the stationary pipe with providing the overlapping portion, after initial layer welding by way of the keyhole welding of the groove of the stationary pipe as shown in FIG. 26. In FIG. 26, the bead 41 is the initial layer, 46 denotes the external bead and 47 denotes the internal bead. The sample base material was API 5L-X60 steel (thickness 16 mm) of 20 inches in pipe diameter. The plasma arc welding conditions are shown in the following Table 15.

Fourteenth Embodiment

This embodiment is an example, in which the downwardly progressing welding is performed on the external surface of the stationary pipe after initial layer welding by way of plasma arc welding.

Figure 27:
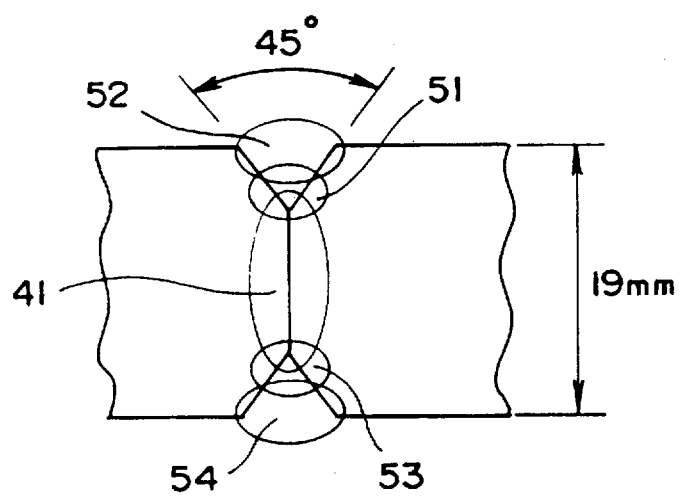
FIG. 27 is a section showing configuration of the joint and the manner of formation of layers in the fourteenth embodiment.

Initially, downwardly progressing keyhole welding was performed on the external surface at the groove of the stationary pipe shown in FIG. 27. In FIG. 27, the bead 41 is the initial layer. Subsequently, non-keyhole welding was performed for second and third layers simultaneously at both of the internal and external surfaces. In FIG. 27, 51 and 52 denotes external beads and 53, 54 denote internal beads. Numeral 50 denotes internal beads.

Here, the sample base material was API 5L-X60 steel (thickness 19 mm) of 20 inches in pipe diameter. The plasma arc welding conditions are shown in the following Table 16.

TABLE 15

| Distinction | | Welding Process | Current (A) | Voltage (V) | Speed (cm/min) | Plasma Gas | Shield Gas |
|---|---|---|---|---|---|---|---|
| Major Welding Portion | 1st Pass | Keyhole | 260–280 | 29–30 | 16–20 | Argon 2.6 l/min | Argon + Hydrogen |
| | 2nd and 3rd Pass | Non-keyhole | 220–240 | 15–19 | 15–19 | Argon 0.7 l/min | Argon + Hydrogen |
| Overlapping Portion | 1st Pass | — | 200–240 | 29–30 | 14–17 | Argon 1.0 l/min | Argon + Hydrogen |
| | 2nd and 3rd Pass | — | 180–210 | 27–29 | 12–16 | Argon 0.4 l/min | Argon + Hydrogen |

In each embodiment, stable welding can be performed. Also, no defect was found.

TABLE 16

| Distinction | Welding Process | Current (A) | Voltage (V) | Speed (cm/min) | Plasma Gas | Shield Gas |
| --- | --- | --- | --- | --- | --- | --- |
| 1st Pass | Keyhole | 300 | 30 | 25 | Argon | Argon (containing 4 to 7% of Hydrogen) |
| 2nd Pass | Non-keyhole | 220 | 28 | 30 | Argon | Argon (containing 4 to 7% of Hydrogen) |

Fifteenth Embodiment

This embodiment is an example, in which the downwardly progressing welding is performed on both the internal and external surfaces of the stationary pipe after initial layer welding by way of laser welding.

At first, the groove is formed in the stationary pipe shown in FIG. 20 in the same manner as the seventh embodiment. Then, initial layer welding was performed in downwardly progressing manner by way of laser welding from the upper end of the stationary pipe.

Here, the sample base material was API 5L-X60 steel (thickness 15 mm) of 20 inches in pipe diameter. The laser welding conditions are shown in the following Table 17.

TABLE 17

| Distinction | Output (kW) | Speed (cm/min) | Shield Gas | Assist Gas |
| --- | --- | --- | --- | --- |
| 1st Pass | 10 | 80 | Helium | Helium |
| 2nd and 3rd Pass | 5 | 80 | Helium | Helium |

Sixteenth Embodiment

This embodiment shows an example of all-position welding at the outer peripheries of the stationary pipe after initial layer welding by the plasma arc welding.

Figure 28:
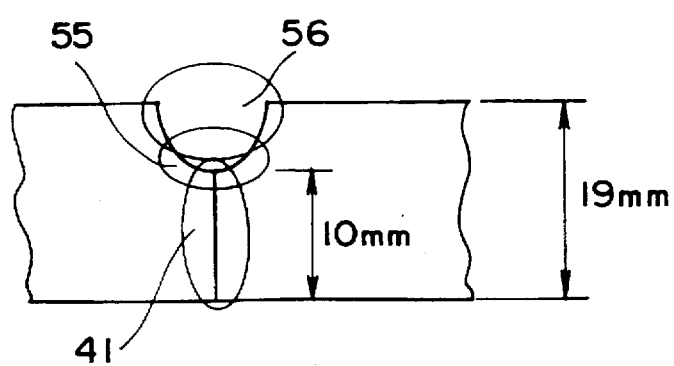
FIG. 28 is a section showing configuration of the joint and the manner of formation of layers in the sixteenth embodiment.

The initial layer welding was performed simultaneously on the outer periphery by keyhole welding for the groove (a U-groove provided only on the outside) at the joint of the stationary pipes as shown in FIG. 28. In FIG. 28, a bead 41 is the initial layer. Subsequently, the second layer is formed on the outer periphery by way of non-keyhole welding. In the drawing, the reference numerals 55 and 56 denotes external beads.

Here, the sample base material was API 5L-X60 steel (thickness 19 mm) of 30 inches in pipe diameter. The plasma arc welding conditions are shown in the following Table 18.

TABLE 18

| Distinction | Welding Process | Current (A) | Voltage (V) | Speed (cm/min) | Plasma Gas | Shield Gas |
| --- | --- | --- | --- | --- | --- | --- |
| 1st Pass | Keyhole | 320–340 | 31–32 | 22 | Argon | Argon + Hydrogen |
| 2nd Pass | Non-keyhole (Soft Plasma) | 240–270 | 30–32 | 22–23 | Argon | Argon |

Seventeenth Embodiment

This embodiment shows an example of all-position welding at the inner peripheries of the stationary pipe after initial layer welding by the plasma arc welding.

Initially, the initial layer welding was performed on the inner periphery for the groove (a Y-groove provided only on the inner periphery) by downwardly progressing keyhole welding at the joint of the stationary pipes as shown in FIG. 22. In FIG. 22, a bead 41 is the initial layer. Subsequently, the second layer is formed on the inner periphery. In the drawing, 50 denotes the internal beads. In comparison with the downwardly progressing welding on the external surface, the downward progress containing the upward position factor, in which the bead can droop down, is performed at the initial stage of welding so that the drooping down of the bead due to further heating in the pipe in the later stage of the downward progress can be successfully avoided.

Here, the sample base material was API 5L-X60 steel (thickness 19 mm) of 30 inches of pipe diameter. The plasma arc welding conditions are shown in the following Table 19.

TABLE 19

| Distinction | Welding Process | Current (A) | Voltage (V) | Speed (cm/min) | Plasma Gas | Shield Gas |
| --- | --- | --- | --- | --- | --- | --- |
| 1st Pass | Keyhole | 300–320 | 30–32 | 21 | Argon | Argon + Hydrogen |
| 2nd Pass | Non-keyhole (Soft Plasma) | 240–260 | 30 | 23 | Argon | " |

Eighteenth Embodiment

This embodiment is an example, in which the welding of the stationary pipe is completed only by the initial layer welding. This embodiment is suitable for welding pipes having relatively thin wall for a pipe line.

Figure 29A:
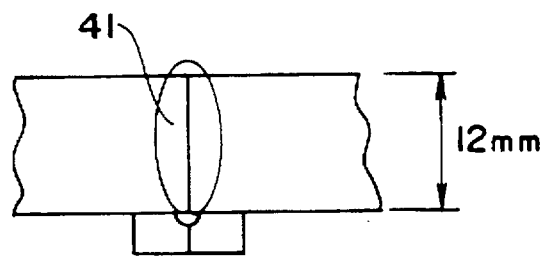
FIGS. 29A and 29B are sections showing configuration of the joint and the manner of formation of layers in the eighteenth embodiment.
Figure 29B:
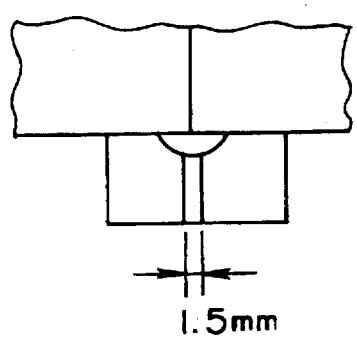

The initial layer welding for the groove (an I-groove) of the joint of the stationary pipes shown in FIGS. 29A and 29B is performed by downwardly progressing keyhole welding. In the drawing, the bead 41 is the initial layer. For the backing material, a center slit was formed for passing the plasma jet. When the width of the slit is insufficient, escaping of the plasma jet becomes insufficient to disturb the molten pool and to form the blow hole in the worst case.

Therefore, a slit which is too narrow is not desirable. On the other hand, when the slit width is greater than or equal to 3 mm, a good penetration bead cannot be formed. Therefore, the preferred range of the width of the slit is 0.5 to 3 mm.

Here, the sample base material was API 5L-X60 steel (thickness 12 mm) of 20 inches in pipe diameter. The plasma arc welding conditions are shown in the following Table 20. Since breakage tends to be caused when the amount of hydrogen is excessive, hydrogen is not used as the shield gas.

TABLE 20

| Distinction | Welding Process | Current (A) | Voltage (V) | Speed (cm/min) | Plasma Gas | Shield Gas |
| --- | --- | --- | --- | --- | --- | --- |
| 1st Pass | Keyhole Employing Backing Material | 300–330 | 31–33 | 19 | Argon | Argon + $CO_2$ |

Nineteenth Embodiment

Figure 30:
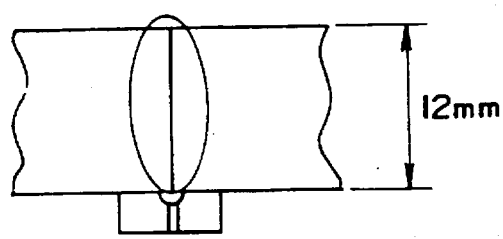
FIG. 30 is a section showing configuration of the joint and the manner of formation of layers in the nineteenth embodiment.

This embodiment is an example, in which the welding of the stationary pipe is completed only by the initial layer welding. This embodiment is suitable for welding pipes having relatively thin wall for a pipe line.

of the joint of the stationary pipes shown in FIG. 30 is performed by downwardly progressing keyhole welding employing the backing material. In the drawing, the bead 41 is the initial layer. Different from the eighteenth embodiment, the shown embodiment employs a pulse current to achieve welding with lesser drooping down of the bead.

Here, the sample base material was API 5L-X60 steel (thickness 12 mm) of 20 inches in pipe diameter. The plasma arc welding conditions are shown in the following Table 21. Since breakage tends to be caused when the amount of hydrogen is excessive, hydrogen is not used as the shield gas.

TABLE 21

| Distinction | Welding Process | Current (A) | Voltage (V) | Speed (cm/min) | Plasma Gas | Shield Gas |
| --- | --- | --- | --- | --- | --- | --- |
| 1st Pass | Keyhole | Pulse of 280/320 | 32–34 | 15 | Argon | Argon + $CO_2$ |

Twentieth Embodiment

This embodiment is an example, in which the all-position welding is performed for the stationary pipe by providing the overlapping portion, after initial layer welding by way of the plasma arc welding of the groove of the stationary pipe.

The initial layer welding was performed on the external surface of the stationary pipe by way of the keyhole welding at the groove (a U-groove formed only on the external side) of the stationary pipe in FIG. 28. Subsequently, second and third layers are formed by way of non-keyhole welding.

The sample base material was API 5L-X60 steel (thickness 19 mm) of 20 inches of pipe diameter. The plasma arc welding conditions are shown in the following Table 22.

TABLE 22

| Distinction | | Welding Process | Current (A) | Voltage (V) | Speed (cm/min) | Plasma Gas | Shield Gas |
| --- | --- | --- | --- | --- | --- | --- | --- |
| Major Welding Portion | 1st Pass | Keyhole | 280–320 | 31–32 | 20–22 | Argon 2.5 l/min | Argon + Hydrogen |
| | 2nd and 3rd Pass | Non-keyhole (Soft plasma) | 240–27 | 30–32 | 20–22 | Argon 0.9 l/min | Argon + Hydrogen |
| Overlapping Portion | 1st Pass | — | 240–260 | 31–32 | 15–17 | Argon 1.2 l/min | Argon + Hydrogen |
| | 2nd and 3rd Pass | — | 200–230 | 26–29 | 12–16 | Argon 0.5 l/min | Argon + Hydrogen |

In each embodiment, stable welding can be performed. Also, no defect was found.

As set forth above, according to the present invention, the stationary pipe can be welding at high speed and high efficiency. The welding process according to the present invention is equally effective for welding, such as the welding for the tank from the upper end to the lower end.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A plasma welding process for an initial layer welding in a circumferential direction for stationary pipes mating in alignment in a horizontal or a tilted orientation through a process, in which a voltage is applied between an electrode and an object for welding by injecting a plasma gas to generate a plasma, and welding is performed by using the plasma as a heat source, wherein said tilted orientation is any angle greater than horizontal and less than vertical, comprising the steps of:

performing welding either on an internal surface of a lower half of said stationary pipes or on the internal surface of the lower half as well as a small portion of an internal surface of an upper half of said stationary pipes; and performing welding either on the external surface of the upper half of said stationary pipes or on the external surface of the upper half of said stationary pipes as well as a small portion of the external surface of the lower half of said stationary pipes.

2. A plasma welding process as set forth in claim 1, wherein welding on the internal periphery and welding on the external periphery are performed simultaneously.

3. A plasma welding process as set forth in claim 1, wherein all position welding is performed on internal and/or external surfaces of said stationary pipes on the entire circumference after said initial layer welding.

4. A plasma welding process as set forth in claim 1, wherein an overlapping portion is provided between a first bead formed by welding for the upper half of said stationary pipe and a second bead formed by welding for the lower half of said stationary welding.

5. A plasma welding process as set forth in claim 4, wherein said overlapping portion has a length of 5 mm or more.

6. A plasma welding process as set forth in claim 4, wherein a welding current and/or plasma flow rate at said overlapping portion are maintained lower than those at other portion.

7. A plasma welding process for an initial layer welding in a circumferential direction for stationary pipes mating in alignment in a horizontal or a tilted orientation through a process, in which a voltage is applied between an electrode and an object for welding by injecting a plasma gas to generate a plasma, and welding is performed by using the plasma as a heat source, wherein said tilted orientation is any angle greater than horizontal and less than vertical, comprising the steps of:

starting welding from the upper end of said stationary pipes and progressing the welding constantly in a downward direction; and providing an overlapping portion between a first bead formed by welding in a clockwise direction from the upper end of said stationary pipe and a second bead formed by welding in a counterclockwise direction from the upper end of said stationary pipe.

8. A plasma welding process as set forth in claim 7, wherein the length of said overlapping portion is 5 mm or more.

9. A plasma welding process as set forth in claim 7, wherein a welding current and/or plasma flow rate at said overlapping portion are maintained lower than those at other portion.

10. A plasma welding process for an initial layer welding in a circumferential direction for stationary pipes mating in alignment in a horizontal or a tilted orientation through a process, in which a voltage is applied between an electrode and an object for welding by injecting a plasma gas to generate a plasma, and welding is performed by using the plasma as a heat source, wherein said tilted orientation is any angle greater than horizontal and less than vertical, comprising the step of:

performing welding over the entire circumference of said stationary pipes with a first bead welding a first portion of the entire circumference and a second bead welding a second portion of said entire circumference said first bead formed by a first welding head and said second bead overlapping a part of said first portion and formed either by said first welding head or by a second welding head.

* * * * *